United States Patent
Phanse et al.

(10) Patent No.: US 10,354,068 B2
(45) Date of Patent: *Jul. 16, 2019

(54) ANONYMIZED APPLICATION SCANNING FOR MOBILE DEVICES

(71) Applicant: AirWatch LLC, Atlanta, GA (US)

(72) Inventors: Shruti Phanse, Atlanta, GA (US); Bhavesh Krishna Kumar, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,284

(22) Filed: Jan. 29, 2018

(65) Prior Publication Data

US 2018/0150636 A1 May 31, 2018

Related U.S. Application Data

(63) Continuation of application No. 15/098,588, filed on Apr. 14, 2016, now Pat. No. 9,916,446.

(51) Int. Cl.
*G06F 21/56* (2013.01)
*G06F 21/60* (2013.01)
(Continued)

(52) U.S. Cl.
CPC .............. *G06F 21/56* (2013.01); *G06F 21/60* (2013.01); *H04L 63/10* (2013.01);
(Continued)

(58) Field of Classification Search
CPC ......... G06F 21/56; G06F 21/60; H04L 63/20; H04L 63/1416; H04L 63/1441; H04W 12/08
See application file for complete search history.

(56) References Cited

U.S. PATENT DOCUMENTS 6,453,419 B1 * 9/2002 Flint ....................... H04L 29/06
726/1
7,089,552 B2 * 8/2006 Atallah ..................... G06F 8/71
717/175
(Continued)

FOREIGN PATENT DOCUMENTS

WO    WO 2015/085404 A1 *  6/2015  .............. H04W 4/12

OTHER PUBLICATIONS

Nadji, Yacin, Jonathon Giffin, and Patrick Traynor. "Automated remote repair for mobile malware." Proceedings of the 27th Annual Computer Security Applications Conference. (pp. 413-422). ACM, 2011. (Year: 2011).*

(Continued)

*Primary Examiner* — Kari L Schmidt
(74) *Attorney, Agent, or Firm* — Thomas Horstemeyer, LLP

(57) ABSTRACT

Disclosed are various approaches for integrating application scanning into a mobile enterprise computing management system. A management service instructs the client device to provide a list of installed applications to the management service and receives the list of installed applications from the client device. The management service then adds the list of installed applications to an aggregate listing of applications representing a list of client applications installed on one or more client devices. Subsequently, the management service sends to a scanning service a policy comprising an identifier of a client application that is prohibited on the client device. The management service also sends the aggregate listing of applications to the scanning service. The management service then receives a notification from the scanning service that the prohibited client application is present in the aggregate listing of applications. In response, the management service determines whether the prohibited client application is installed on the client device and (Continued)

instructs the client device perform a remedial action specified by the policy.

20 Claims, 4 Drawing Sheets

(51) Int. Cl.
 *H04L 29/06* (2006.01)
 *H04W 12/08* (2009.01)
(52) U.S. Cl.
 CPC ...... *H04L 63/1416* (2013.01); *H04L 63/1441* (2013.01); *H04L 63/20* (2013.01); *H04W 12/08* (2013.01); *G06F 2221/034* (2013.01)

(56) References Cited

U.S. PATENT DOCUMENTS

| | | | | |
|---|---|---|---|---|
| 7,665,125 | B2* | 2/2010 | Heard | G06F 21/577 713/170 |
| 8,201,256 | B2* | 6/2012 | Patanella | G06F 21/577 726/23 |
| 8,495,700 | B2* | 7/2013 | Shahbazi | H04L 63/20 380/247 |
| 8,849,979 | B1* | 9/2014 | Qureshi | H04L 12/2856 709/223 |
| 8,869,235 | B2* | 10/2014 | Qureshi | H04L 63/20 713/150 |
| 8,886,925 | B2* | 11/2014 | Qureshi | H04L 63/20 713/150 |
| 8,909,928 | B2* | 12/2014 | Ahmad | G06F 21/57 713/168 |
| 9,288,199 | B1* | 3/2016 | Winn | H04L 63/08 |
| 9,374,389 | B2* | 6/2016 | Bishop | H04L 63/20 |
| 9,529,996 | B2* | 12/2016 | Qureshi | G06F 21/53 |
| 9,705,919 | B1* | 7/2017 | Jacobsen | H04L 63/20 |
| 9,712,547 | B2* | 7/2017 | Touboul | H04L 63/1416 |
| 9,894,099 | B1* | 2/2018 | Jacobsen | H04L 63/20 |
| 10,185,826 | B1* | 1/2019 | Thomas | G06F 21/566 |
| 2004/0083383 | A1* | 4/2004 | Carmona | G06F 21/56 726/24 |
| 2004/0123153 | A1* | 6/2004 | Wright | G06F 21/32 726/1 |
| 2005/0010448 | A1* | 1/2005 | Mattera | G06Q 10/10 705/3 |
| 2006/0070131 | A1* | 3/2006 | Braddy | G06F 21/31 726/27 |
| 2007/0192139 | A1* | 8/2007 | Cookson | G06Q 10/10 705/3 |
| 2007/0261051 | A1* | 11/2007 | Porter | G06F 21/554 717/174 |
| 2008/0034363 | A1* | 2/2008 | Jones | G06F 8/60 717/174 |
| 2008/0189326 | A1* | 8/2008 | Norrie | G06F 8/60 |
| 2008/0222280 | A1* | 9/2008 | Lippincott | H04L 41/00 709/223 |
| 2010/0031361 | A1* | 2/2010 | Shukla | G06F 21/567 726/24 |
| 2010/0275252 | A1* | 10/2010 | Yun | G06F 21/121 726/7 |
| 2011/0145920 | A1* | 6/2011 | Mahaffey | G06F 21/564 726/22 |
| 2012/0291102 | A1* | 11/2012 | Cohen | G06F 21/57 726/4 |
| 2013/0097660 | A1* | 4/2013 | Das | H04L 63/10 726/1 |
| 2013/0283377 | A1* | 10/2013 | Das | G06F 21/51 726/23 |
| 2014/0113588 | A1* | 4/2014 | Chekina | G06F 21/552 455/410 |
| 2015/0143455 | A1* | 5/2015 | Bettini | H04W 12/12 726/1 |
| 2016/0050226 | A1* | 2/2016 | Bettini | H04L 63/0245 726/1 |
| 2016/0162924 | A1* | 6/2016 | Rathod | G06Q 30/0217 705/14.19 |

OTHER PUBLICATIONS

X. Li, P. Avellino, J. Janies and M. P. Collins, "Software asset analyzer: A system for detecting configuration anomalies," MILCOM 2016—2016 IEEE Military Communications Conference, Baltimore, MD, 2016, pp. 998-1003. (Year: 2016).*

Vorakulpipat, Chalee, Chantri Polprasert, and Siwaruk Siwamogsatham. "Managing mobile device security in critical infrastructure sectors." Proceedings of the 7th International Conference on Security of Information and Networks.(pp. 65) ACM, 2014. (Year: 2014 ).*

S. Ali, M. N. Qureshi and A. G. Abbasi, "Analysis of BYOD security frameworks," 2015 Conference on Information Assurance and Cyber Security (CIACS), Rawalpindi, 2015, pp. 56-61. (Year: 2015).*

P. Kodeswaran, V. Nandakumar, S. Kapoor, P. Kamaraju, A. Joshi and S. Mukherjea, "Securing Enterprise Data on Smartphones Using Run Time Information Flow Control," 2012 IEEE 13th International Conference on Mobile Data Management, Bengaluru, Karnataka, 2012, pp. 300-305. (Year: 2012).*

* cited by examiner

ANONYMIZED APPLICATION SCANNING FOR MOBILE DEVICES

BACKGROUND

This application claims priority to, and the benefit of, co-pending U.S. patent application Ser. No. 15/098,588, entitled ANONYMIZED APPLICATION SCANNING FOR MOBILE DEVICES and filed on Apr. 14, 2016, which is incorporated by reference as if set forth herein in its entirety.

BACKGROUND

Mobile computing devices are increasingly being targeted by malware applications, which are intentionally engineered to take control of a mobile computing device or covertly access data stored on or available to the mobile computing device. Malware applications can include self-replicating programs that attempt to automatically install themselves on other, uncompromised, mobile computing devices. These applications are often referred to as "worms" or "viruses." Malware applications can also include programs that are designed to trick or otherwise convince a user to install the program, for example by appearing to be a legitimate program or appearing to come from a reputable source. These applications can include "rootkits," "trojans," and "backdoors."

Currently, users can install applications on a mobile computing device from a number of sources. For example, ANDROID® devices allow a user to install applications from the GOOGLE® PLAY® store. Similarly, APPLE® devices allow a user to install applications from the ITUNES® store. In both cases, the applications available are generally screened before users are allowed to download and install the applications, but malware developers are regularly devising new techniques to circumvent these screenings in order to make malware applications available through the PLAY store or the ITUNES store.

As another example, some mobile computing devices, such as those running the ANDROID operating system, allow users to install applications from third-party application stores. For example, a third-party application store can allow users to install applications that are not approved for distribution through the GOOGLE PLAY store. Although these third-party application stores can contain many legitimate applications, malware applications can also be available through these third-party stores. Further, some of these third-party stores cannot have rigorous vetting requirements for applications that they make available to the public. Accordingly, installing applications from these third-party application stores can have an increased risk of infecting a user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for integrating application scanning into a mobile enterprise computing management system. Many enterprises allow for employees to use personal devices for work purposes. However, the use of personal devices by employees present problems regarding application and device security. An enterprise is often unable to control the sources from which an employee can install applications. Further, an enterprise could be unable to control or be unaware of the numerous different applications that an employee could install on their personal device. Although an enterprise can offer a repository of preapproved applications that the enterprise has vetted and verified as not being malware, an enterprise could be unable to prevent an employee from installing alternative applications that contain malware. Similarly, an enterprise could also be unable to prevent an employee from installing personal applications that contain malware. To address these issues, an enterprise can integrate malware scanning into mobile device management software deployed by the enterprise for employees to install on their personal mobile devices, as further discussed in this application. Use of a personal mobile device for work purposes can be predicated upon installation of this mobile device management software.

Figure 1:
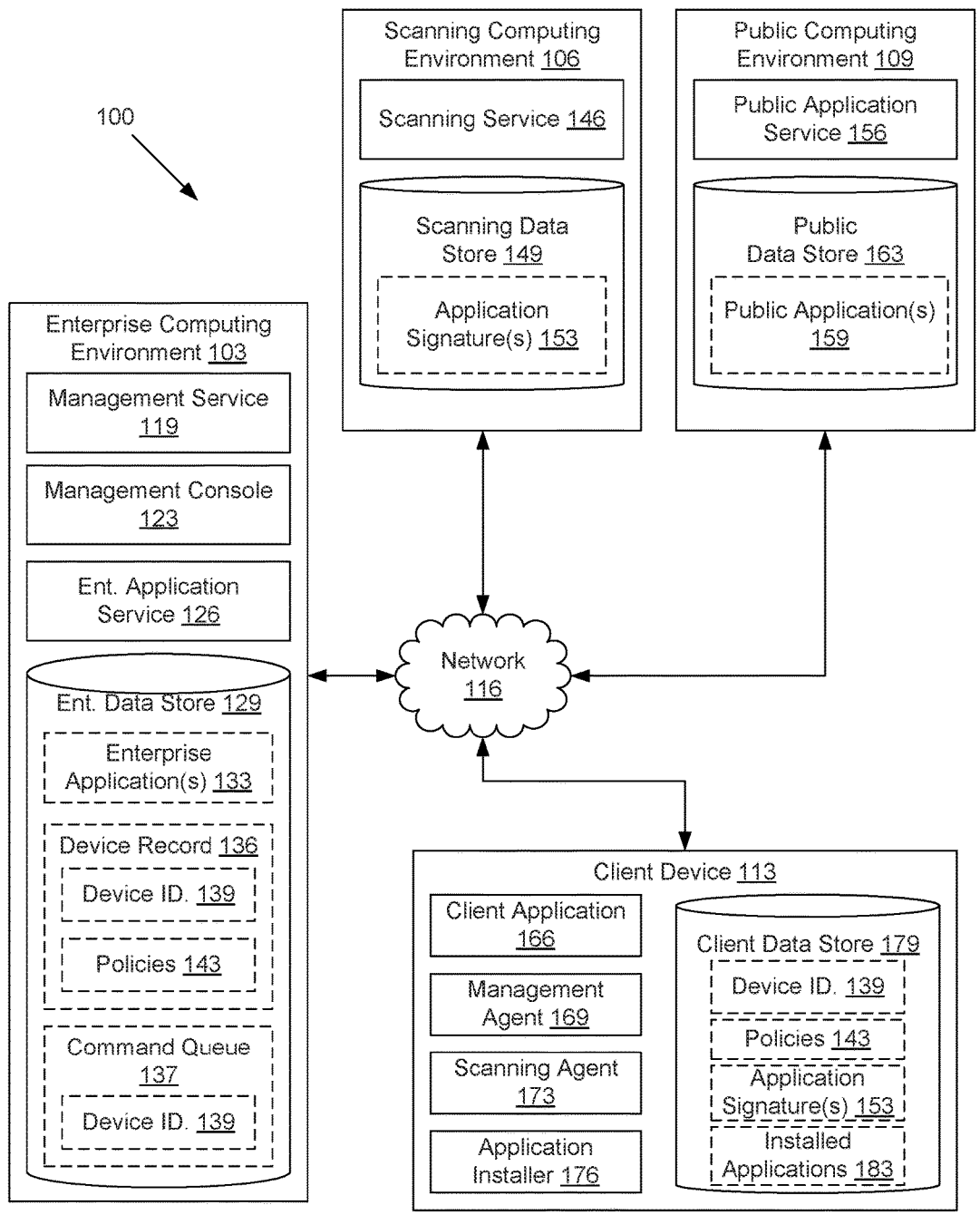
FIG. 1 is a schematic block diagram of a network environment.

FIG. 1 is a schematic block diagram depicting a networked environment 100 according to various embodiments of the present disclosure. The networked environment 100 includes an enterprise computing environment 103, a scanning computing environment 106, a public computing environment 109, and a client device 113, which are in data communication with each other over a network 116. The network 116 can include the Internet, intranets, extranets, wide area networks (WANs), local area networks (LANs), wired networks, wireless networks, or other suitable networks, or any combination of two or more networks. For example, the networks can include satellite networks, cable networks, Ethernet networks, and other types of networks.

The enterprise computing environment 103, the scanning computing environment 106, and the public computing environment 109 can include a server computer or any other system providing computing capability. Alternatively, the enterprise computing environment 103, the scanning computing environment 106, and the public computing environment 109 can employ a plurality of computing devices that can be arranged in one or more server banks, computer banks, or other arrangements. The computing devices can be located in a single installation or can be distributed among many different geographical locations. For example, the enterprise computing environment 103, the scanning computing environment 106, and the public computing environment 109 can include a plurality of computing devices that together include a hosted computing resource, a grid computing resource, or any other distributed computing arrangement. In some cases, the enterprise computing environment 103, the scanning computing environment 106, and the public computing environment 109 can correspond to an elastic computing resource where the allotted capacity of processing, network, storage, or other computing-related resources that vary over time.

Although the enterprise computing environment 103, the scanning computing environment 106, and the public computing environment 109 are depicted as separate computing environments, in some instances one or more of the enterprise computing environment 103, the scanning computing environment 106, and the public computing environment 109 can be merged. For example, in some instances, the functionality of the enterprise computing environment 103 and the scanning computing environment 106 could be provided by a single computing environment. As another example, the functionality of the scanning computing environment 106 and the public computing environment 109 could be provided by a single computing environment. Other combinations of enterprise computing environment 103, the scanning computing environment 106, and the public computing environment 109 are included in the scope of this disclosure.

Various applications or other functionality can be executed in the enterprise computing environment 103 according to various embodiments. The components executed on the enterprise computing environment 103 can include a management service 119, a management console 123, and an enterprise application service 126. However, other applications, services, processes, systems, engines, or functionality can be provided by the enterprise computing environment 103.

The management service 119 can administer the operation of client devices 113 registered or otherwise enrolled with the management service 119. To this end, the management service 119 can enforce or otherwise require particular applications to be installed on an enrolled client device 113, require the client device 113 to be configured in a particular manner, or require that particular features be enabled or disabled on the client device 113, as further described below.

The management console 123 can provide an administrative interface for configuring the operation of the management service 119 and the configuration of client devices 113 that are administered by the management service 119. Accordingly, the management console 123 can correspond to a web page or web application provided by a web server hosted in the enterprise computing environment 103.

The enterprise application service 126 can provide applications that have been previously approved or otherwise authorized by an enterprise for installation on a registered client device 113. The enterprise application service 126 can include a repository of approved applications and provide various search functions allowing users to browse or otherwise find particular applications to install from the enterprise application service 126. The enterprise application service 126 can also provide various mechanisms for remotely update, upgrading, and deleting applications previously installed on the client device 113 using the enterprise application service 126.

Various data is stored in an enterprise data store 129 that is accessible to the enterprise computing environment 103. The enterprise data store 129 can include one or more relational databases or non-relational databases (e.g., hierarchical databases, key-value databases, object databases, files, or other non-relational databases). The data stored in the enterprise data store 129 is associated with the operation of the various applications or functional entities discussed in this application.

The data stored in the enterprise data store 129 includes enterprise applications 133, device records 136, a command queue 137, and potentially other data. Enterprise applications 133 include one or more applications that have been previously approved or otherwise authorized by an enterprise for installation on a registered client device 113 through the enterprise application service 126. An enterprise application 133 can include specific applications (e.g., specific email clients, web browsers, messaging applications, or other applications), specific versions of approved applications, applications from approved vendors or distributors, or other classes of applications. Device records 136 include information about individual client devices 113 registered or enrolled with the management service 119. Each device record 136 can correspond to a client device 113 identified by the device identifier 139. The device identifier 139 can include a serial number, digital signature, or other identifier that uniquely identifies a client device 113 with respect to other client devices 113 enrolled with the management service 119. In some instances, the device identifier 139 can be added to the device record 136 when the client device 113 enrolls with the management service 119. Each device record 136 can include one or more policies 143 applicable to a client device 113 corresponding to the device identifier 139.

The command queue 137 represents a queue where one or more commands to be executed by the client device 113 can be stored. For example, the management service 119 may issue one or more commands to be performed by the client device 113 or an application execution on the client device 113. The commands can be stored in the command queue 137 until commands are requested by the client device 113, as later described in this application. In some instances, a separate command queue 137 can be created for each client device 113. In these instances, each command queue 137 may also include the device identifier 139 for the client device 113 assigned to the command queue 137.

A policy 143 can specify various configuration details for a client device 113. For example, a policy 143 can specify that certain client applications be installed on the client device 113. Similarly, a policy 143 can identify specific client applications that are not authorized to be installed on the client device 113. As another example, a policy 143 can specify that certain versions of a client application be installed on the client device 113. Likewise, a policy 143 can specify that certain versions of a client application (e.g. a version with a known security defect) are not authorized to be installed on the client device 113.

In some instances, a policy 143 can specify that a client application 166 have certain permissions enabled or disabled. For example, a policy 143 can specify that a particular client application 166, such as a flashlight application or calculator application, not be allowed to access the network 116. As another example, a policy 143 can specify whether a client application 166 has read or write access to particular files stored on the client device 113. As a further example, a policy 143 could specify whether a client application 166 is allowed to access the network 116 or use a particular network interface (e.g., a cellular network connection, a Wi-Fi network connection, or a wired network connection). Access to the camera, microphone, external storage, or other hardware functions of the client device 113 by the client application 166 could be similarly be specified by a policy 143. In other instances, the policy 143 could specify that the client device 113 whether the client application 166 is permitted access to particular files or to particular types of data, such as emails, address book records, call history, text messages, or other data stored on the client device 113.

A policy 143 can also specify remedial actions to be performed in response to a determination that the client device 113 violates the policy 143. For example, the policy 143 could specify as a remedial action that the client device 113 should uninstall an unauthorized client application. As another example, the policy 143 could specify as a remedial action that the client device 113 upgrade the client application to an authorized version. Similarly, the policy 143 could specify as a remedial action that the client device 113 downgrade the client application to an older, authorized version of the client application.

As another example, the policy 143 could specify as a remedial action that the client device 113 modify a permission assigned to the client application. For instance, the policy 143 could specify that the client device 113 disallow network 116 access for the client application. Likewise, if a policy 143 could specify as a remedial action that permission to access to the camera, microphone, external storage, or other hardware functions of the client device 113 be disallowed. In other instances, the policy 143 could specify that the client device 113 disallow previously authorized access to particular files or to particular types of data, such as emails, address book records, call history, text messages, or other data stored on the client device 113.

As another example, the policy 143 could specify that the client device 113 modify a setting of the client application. For instance, the policy 143 could specify that an application communicate with a specific server, use encrypted protocols such as various versions of the secure sockets layer (SSL) or transport layer security (TLS) protocol, or route network 116 traffic through particular proxy servers. In another example, the policy 143 could specify as a remedial action that the client device 113 uninstall an unauthorized client application and replace it with an equivalent, but authorized client application. For example, the client device 113 could replace an unauthorized instant messaging application with a different instant messaging application that has been authorized for use.

The scanning computing environment 106 can, in some instances, correspond to a computing environment separate from the enterprise computing environment 103 or the public computing environment 109. In these instances, the scanning computing environment 106 can be operated or controlled by a separate entity or party from those that control the enterprise computing environment 103 or the public computing environment 109. Various applications can be executed in the scanning computing environment 106. The components executed on the scanning computing environment 106 can include a scanning service 146 and other applications, services, processes, systems, engines, or functionality.

The scanning service 146 can be executed to scan various client applications installed on the client device 113. For example, the scanning service 146 can scan a client application 166 to determine whether the client application 166 is an instance of malware application. As another example, the scanning service 146 can scan a client application 166 to determine whether the client application 166 violates one or more policies 143 assigned to the client device 113.

Also, various data is stored in a scanning data store 149 that is accessible to the scanning computing environment 106. The scanning data store 149 can include one or more relational databases or non-relational databases (e.g., hierarchical databases, key-value databases, object databases, files, or other non-relational databases). The data stored in the scanning data store 149 can include one or more application signatures 153 and potentially other data.

Application signatures 153 can include one or more unique application identifiers that uniquely identify a client application 166 with respect to one or more other client applications 166. For example, an application signature 153 can include a cryptographic hash or digital signature of the binary executable file corresponding to a client application 166, such as a malware application. The cryptographic signatures can be generated using various cryptographic hash functions, such as the digital signature algorithm (DSA), various versions of the secure hash algorithm (e.g. SHA-1, SHA-2, and SHA-3), various versions of the message digest algorithm (e.g. MD2, MD4, MD5, and MD6), as well as various other cryptographic hash functions. As another example, an application signature 153 can include a cryptographic hash or digital signature for a portion of the binary executable file corresponding to an application. The portion of the binary executable file can correspond to a library, sub-routine, application programming interface (API), or other executable segments of software. The library, sub-routine, or API could correspond to malware inserted into an otherwise harmless client application 166.

The public computing environment 109 can, in some instances, correspond to a computing environment separate from the enterprise computing environment 103 or the scanning computing environment 106. In these instances, the public computing environment 109 can be operated or controlled by a separate entity or party from those that control the enterprise computing environment 103 or the scanning computing environment 106. Various applications can be executed in the public computing environment 109. The components executed on the public computing environment 109 can include a public application service 156 and other applications, services, processes, systems, engines, or functionality.

The public application service 156 can provide applications, such as one or more public application 159, for installation on a client device 113. The public application service 156 can include a "store" provided by the manufacturer of the client device 113 or developer of the operating system of the client device 113, such as the APPLE ITUNES or GOOGLE PLAY store. Generally, the public application service 156 is available to any client device 113. For example, any APPLE IPHONE® can access the APPLE ITUNES store and any GOOGLE ANDROID phone can access the GOOGLE PLAY store.

The public data store 163 can include one or more relational databases or non-relational databases (e.g., hierarchical databases, key-value databases, object databases, files, or other non-relational databases). The data stored in the public data store 163 is associated with the operation of the various applications or functional entities discussed in this application. For example, one or more public applications 159 can be stored in the public data store 163 for use by the public application service 156.

Public applications 159 can include one or more applications that can be sent by the public application service 156 to a client device 113 for installation on the client device 113. Public applications 159 can include any type of application configured to be executed on the client device 113. Examples of public applications 159 include messaging clients (e.g. text, audio, and video chat or messaging clients), banking applications, games, shopping applications, file management applications, file sharing applications, calendar applications, email applications, media playback applications (e.g. audio or video players), streaming media applications, camera and photography applications, social networking applications, map or navigation applications, and various other applications. Public applications 159 can be provided by the public application service 156 for free (e.g. ad-supported applications) or in exchange for payment.

In some instances, public applications 159 can be screened prior to being made available for installation through the public application service 156. Screening can occur in an automated fashion and can prevent some instances of malware being made available through the public application service 156. However, screening is not always perfect and dubious or malicious applications could be undetected, such as legitimate applications that pose security or privacy concerns due to aggressive user or device tracking or advertising.

The client device 113 is representative of one or more client devices 113 that can be coupled to the network 116. The client device 113 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, a wearable computing device, an augmented reality or virtual reality device, or another device with like capability.

The client device 113 can execute various applications, including a client application 166, a management agent 169, a scanning agent 173, an application installer 176, and potentially other applications. The client application 166 corresponds to any locally installed application executable by the client device 113. For example, the client application 166 could correspond to an installed instance of an enterprise application 133 or a public application 159. The scanning agent 173 can be executed to generate or determine the application signatures of client applications 166 installed on the client device 113 and provide them to the scanning service 146. The application installer 176 can be executed to communicate with either the enterprise application service 126 or the public application service 156 to install, remove, update, or upgrade instances of enterprise applications 133 or public applications 159 on the client device 113. In addition, the application installer 176 can be used to search for enterprise applications 133 or public applications 159 available to install from the enterprise application service 126 or the public application service 156. Accordingly, the application installer 176 also corresponds to a local client that can be used to access the enterprise application service 126 or the public application service 156.

The management agent 169 can maintain data communication with the management service 119 in order to perform various actions on the client device 113 in response to instructions received from the management service 119. In some instances, the management agent 169 includes a separate application executing on the client device 113. In other instances, the management agent 169 includes a mobile device management (MDM) framework provided by or included in the operating system installed on the client device 113. The management agent 169 can be configured to contact the management service 119 at periodic intervals and request that the management service 119 send any commands or instructions stored in the command queue 137 to the management agent 169. The management agent 169 can then cause the client device 113 to perform the commands provided by the management service 119.

Various data can be stored on the client device 113 in a client data store 179. The client data store 179 can include one or more relational databases or non-relational databases (e.g., hierarchical databases, key-value databases, object databases, files, or other non-relational databases). In various instances, the device identifier 139, various policies 143, one or more application signatures 153, and a list of installed applications 183 can be stored in the client data store 179. The list of installed applications 183 can include a list of names, descriptions, and identifiers or application signatures 153 of each client application 166 installed on the client device 113, according to one or more configurations discussed later.

Next, a general description of the operation of the various components of the networked environment 100 is provided. The various components of the networked environment 100 can be configured to operate in several ways. Several of the potential configurations are detailed in the following discussion.

To begin, one or more policies 143 can be created for various client applications 166 installed on client devices 113 enrolled or registered with the management service 119. For example, an administrator can use the management console 123 to create a policy 143 specifying that a particular version of an application (e.g., a version with a serious security vulnerability) cannot be present on the client device 113. The policy 143 could further specify that if the specified version of the application is present on the client device 113, then the application is to be upgraded to a newer version. As another example, the administrator could specify through the management console 123 that any application identified by the scanning service 146 as malware (e.g., a virus, a trojan, a rootkit, or similar malware application) is to be removed from the client device 113. In some instances, this could be taken a step further and the administrator could specify through the management console 123 that the client device 113 should be reset and returned to a previous state, such as the initial state of the client device 113 when it left the factory. This could result in deleting or removing all client applications 166 installed by the user as well as the management agent 169 and the scanning agent 173 (e.g., "wiping" the device or restoring the device to factory defaults). Alternatively, the administrator could specify through the management console 123 that the client device 113 should block access to external resources, such as the network 116, in response to the scanning service 146 identifying any application on the client device 113 as malware.

A client device 113 then enrolls or registers with the management service 119. To enroll or register, a user can provide user details (e.g. username, password, email address, device details, or other information) to the management service 119. For example, the user can enter any necessary information in a web page submitted to the management service 119. In response, the management service 119 can create a device record 136 and assign one or more policies 143 to the device record 136. The management service 119 can also generate and assign a device identifier 139 (e.g., a serial number or other identifier) to the client device 113, or the client device 113 can send a device identifier 139 (e.g. a MAC address or other identifier) to the management service 119.

After enrollment or registration, the management service 119 provides the device identifier 139 to the scanning service 146. This can allow the scanning service 146 to track and store information regarding applications installed on the client device 113 and identify the client device 113 when reporting to the management service 119 as discussed later.

The scanning agent 173 can then download one or more application signatures 153 from the scanning service 146 and one or more policies 143 from the management service 119. Subsequently, the scanning agent 173 can periodically scan the client device 113 to determine whether any of the client applications 166 installed on the client device 113 violate one or more policies 143. For example, the scanning agent 173 could generate a cryptographic hash of each client application 166 installed on the client device 113 and compare each hash to a downloaded application signature 153. If the hash of the client application 166 matches an application signature 153, the scanning agent 173 can then determine if a policy 143 applies to the client application 166 matching the application signature 153. As another example, the scanning agent 173 can periodically scan the list of installed applications 183 to determine if any application identified in the list of installed applications 183 matches an application specified in a policy 143. In either example, the scanning agent 173 can then determine if the presence of the client application 166 on the client device 113 violates the policy 143.

If a client application 166 installed on the client device 113 violates at least one policy 143, then the scanning service 146 can send a notification to the management service 119. The notification can include an identification of the client application 166 that violates the policy 143, an identification of the policy 143 violated, and potentially other information. In response to receipt of the notification, the management service 119 can mark the client device 113 as non-compliant. In some instances, the management service 119 could then add commands to perform one or more remedial actions specified in the policy 143 to the command queue 137 for the management agent 169 to perform. The management agent 169 can retrieve the commands in the command queue 137 from the management service 119 cause the specified remedial actions to be performed (e.g. initiate an upgrade or removal of the client application 166 through the application installer 176). Once the remedial action is successfully performed, the management agent 169 can send a notification to the management service 119 indicating that the remedial action has been performed. The management service 119 can then mark the client device 113 as currently in compliance with the policy 143.

In another configuration, several of the initial steps are performed in a manner similar to the configuration described above. For example, one or more policies 143 are created in a manner similar to the configuration previously described. Likewise a client device 113 enrolls or registers with the management service 119 in a manner similar to the configuration previously described. The management agent 169 can then send the list of installed applications 183 to the management service 119.

The management service 119 can then send the list of installed applications 183 and at least one policy 143 to the scanning service 146. In some instances, the management service 119 can omit the device identifier 139, effectively hiding the device identifier 139 of the client device 113 and anonymizing the client device 113 and its user. In some instances, the management service 119 can receive lists of installed applications 183 from several client devices 113 and send these lists of installed applications 183 as a batch, further anonymizing individual client devices 113.

The scanning service 146 then analyzes each client application 166 included in the list of installed applications 183 and reports the results to the management service 119. For example, the scanning service 146 can determine whether an application in the list of installed applications 183 is specified in a policy 143. As another example, the scanning service 146 can compare an application identified in the list of installed applications 183 with applications signatures 153. If a client application 166 identified in the list of installed applications 183 matches an application signature 153, the scanning service 146 can then compare details of the client application with the supplied policy 143. For example, a policy 143 can specify that client applications 166 that are identified by the scanning service 146 as malware applications should not be installed on the client device 113. If the client application 166 in the list of installed applications 183 matches an application signature 153 of a malware application, then the scanning service 146 could determine that the presence of the client application 166 on the client device 113 violates the policy 143. The scanning service 146 could then send a message to the management service 119 that the client application 166 installed on the client device 113 is a malware application.

If the scanning service 146 has reported a violation of an applicable policy 143, the management service 119 can send a message to the management agent 169 that the client device 113 is in violation of a policy 143. For example, the management service 119 could send a message to the management agent 169 that the client application 166 is a malware application. In some instances, the management service 119 could also send the policy 143 to the management agent 169. As another example, the management service 119 could add one or more commands specifying remedial actions to be performed by the management agent 169 to the command queue 137. The management agent 169 can then retrieve the commands from the management service 119.

The management agent 169 can then perform one or more remedial actions specified in the policy 143 received from the management service 119. For example, if the policy 143 specified that the client application 166 should be removed, then the management agent 169 could cause the application installer 176 to remove the client application 166 from the client device 113. Likewise, if the policy 143 specified that specific data (e.g., confidential enterprise or corporate data, usernames and passwords for enterprise provided services, or other data) should be removed from the client device 113, the management agent 169 could delete the specified data from the memory of the client device 113.

In either of the previously described configurations, as well as other potential configurations, the scanning service 146 can also be integrated with the enterprise application service 126. In these configurations, integration of the scanning service 146 can allow for the enterprise application service 126 to automatically approve new enterprise applications 133 for installation on a client device 113. Approval can occur according to various settings specified by one or more policies 143.

One or more policies 143 can be created through the management console 123. These policies can 143 can specify various configuration details. For example, one policy 143 could specify that the application installer 176 on the client device 113 can only install applications through the enterprise application service 126. If a client application 166 has not been previously vetted and stored as an enterprise application 133, then the client application 166 cannot be installed using the application installer 176. The policies 143 can also specify actions to be taken by the scanning service 146 for automatically approving or denying requests to install applications through the enterprise application service 126 that are not enterprise applications 133. For example, a policy 143 could specify that the application installer 176 can install an application other than an enterprise application 133 if the application to be installed has been previously analyzed by the scanning service 146.

A client device 113 then enrolls or registers with the management service 119 in manner similar to those previously described. In response, the management service 119 sends the policy 143 to the client device 113. The management agent 169 then configures the application installer 176 to only install applications through the enterprise application service 126.

A user of the client device 113 can then use the application installer 176 to send a request to install an application from the enterprise application service 126. If the requested application is an enterprise application 133, then enterprise application service 126 can send a copy of the enterprise application 133 to the application installer 176 to install on the client device 113. However, if the requested application is not an enterprise application 133 (e.g., has not been reviewed and approved by an administrator), then the request can be forwarded to the scanning service 146. In some cases, one or more policies 143 can also be sent to the scanning service 146 along with the request. However, in other instances, the policies 143 could have been previously provided to the scanning service by the enterprise application service 126.

The scanning service 146 analyzes the requested application to be installed and compares it to one or more of the previously created policies 143. For example, the scanning service 146 can analyze the requested application to determine if it matches an application signature 153 of a known malware application. Similarly, the scanning service 146 can analyze the requested application to determine if it matches an application signature 153 of a known software library provided by an online advertising network. As another example, the scanning service 146 can determine if the requested application includes software libraries that match an application signature of a known malware component. Depending on the results of the analysis conducted by the scanning service 146, several actions could potentially be taken.

First, the scanning service 146 could provide a response to the enterprise application service 126 that installation of the requested application would violate a policy 143. The response could include an identification of the policy 143 that would be violated for auditing purposes. For example, the scanning service 146 could determine that the requested application matches the application signature 153 of a known malware application, violating a policy 143 that prohibits installation of known malware, and provide this information to the enterprise application service 126. The enterprise application service 126 could then deny the request of the application installer 176 to install the requested application.

Second, the scanning service could provide a response to the enterprise application service 126 that installation of the requested application would not violate any policies 143. In this instance, the enterprise application service 126 can automatically allow that application installer 176 to install the requested application. The enterprise application service 126 can also add the requested application to the enterprise applications 133 stored in the enterprise data store 129 to streamline future installations.

Alternatively, the enterprise application service 126 could send a message, such as an email, to an administrator prompting the administrator to review and approve installation of the requested application. The administrator could then use the management console 123 to approve or deny installation of the requested application. If the administrator approves installation of the requested application, then the enterprise application service 126 can send the requested application to the application installer 176 for installation on the client device 113. The requested application can also be added to the enterprise applications 133 to streamline the process for future installations. If the administrator denies installation of the requested application, then enterprise application service 126 sends a message to the application installer 176 indicating that the administrator has denied the request to install the application. This configuration could be implemented in high-security environments where all enterprise applications 133 must be manually reviewed and approved. These configurations would act as a filter for administrators, allowing them to review only those applications that were not automatically rejected as violating a policy 143.

Figure 2:
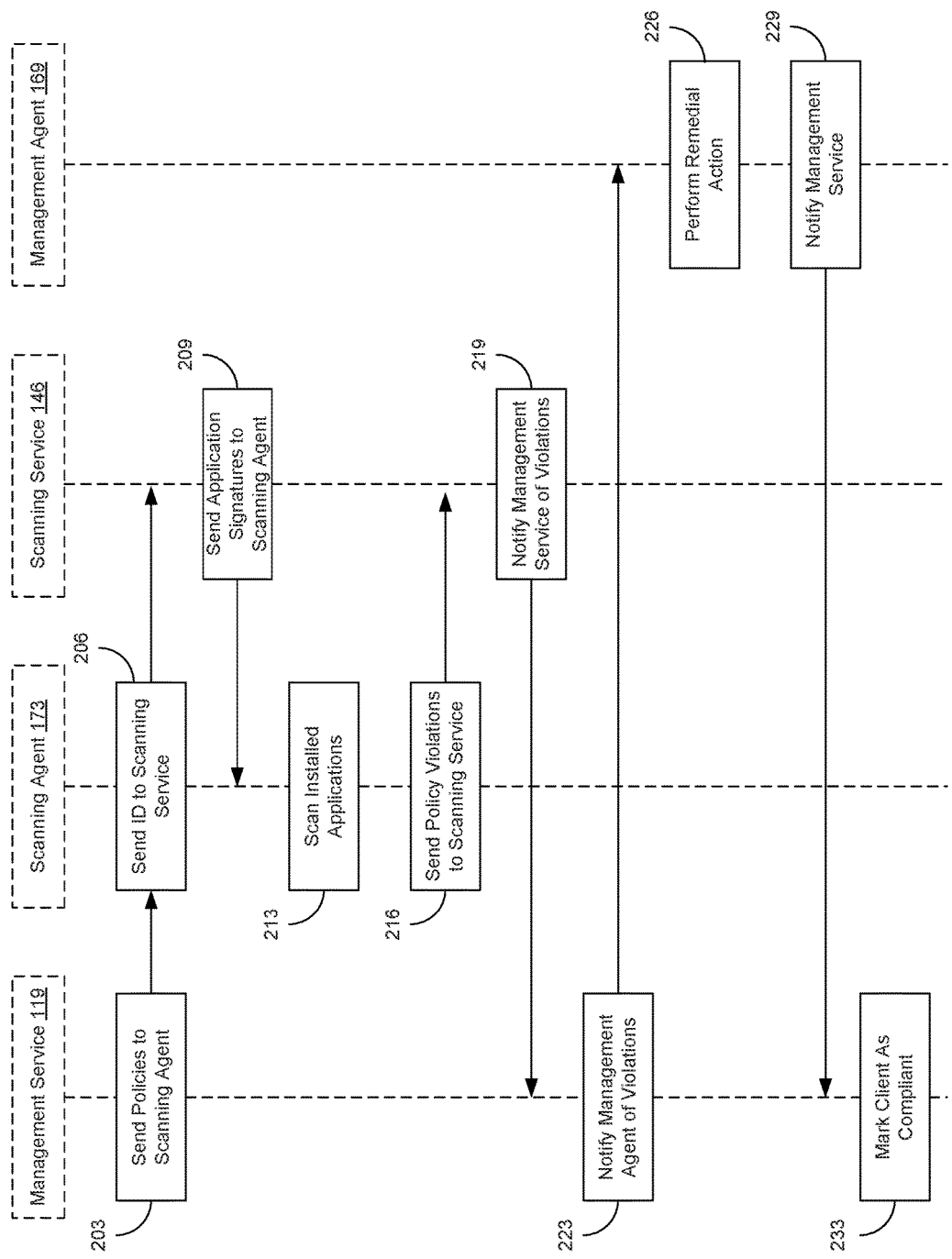
FIG. 2 is a sequence diagram depicting the interaction of various components.

In some instances, the management service 119 can also send one or more configuration profiles to the client device 113 in order to cause a client application 166 or the client device 113 itself to conform to the policy 143. For instance, if a client application 166 is configured in a prohibited manner (e.g., does not use secure sockets layer (SSL) or transport layer security (TLS) protocols to connect to a server), the management service 119 could add a command to the command queue 137 specifying that the management agent 169 reconfigure the client application 166 in order to conform to the policy 143. Referring next to FIG. 2, shown is a sequence diagram that provides one example of the integration of a scanning service 146 into an enterprise computing management system provided by a management service 119. Accordingly, the interaction between portions of the management service 119, the scanning service 146, the management agent 169, and the scanning agent 173 are depicted in FIG. 2.

To begin, an administrative user manually creates through the management console 123 one or more policies 143 that specify various configuration details for a client device 113. Such policies 143 could include those example policies 143 previously described above or other policies 143. The administrative user can then use the management console 123 to assign, link, or otherwise associate the policy 143 to an individual client device 113 or group of client devices 113 in which a client device 113 belongs (e.g., all client devices 113 at a particular office, in a particular department, or belonging to a particular class of users, in a particular country). Then, at step 203, the management service 119 sends one or more policies 143 to the scanning agent 173. The policies 143 can be selected, for example, by querying the device record 136 containing the device identifier 139 of the client device 113 and selecting the policies 143 contained in the device record 136.

Proceeding to step 206, the scanning agent 173 sends the device identifier 139 of the client device 113 to the scanning service 146. This can allow the scanning service 146 to track the results of a scan for a client device 113 and report the results of an individual client device to the management service 119, as further described in this application.

Moving on to step 209, the scanning service 146 sends one or more application signatures 153 to the scanning agent 173. In some configurations, the application signatures 153 can be sent in response to the scanning service 146 receiving the device identifier 139. In other configurations, the application signatures 153 can be periodically sent to the scanning agent 173. For example, as new application signatures 153 are created or existing application signatures 153 are updated, these changes can be sent by the scanning service 146 to the scanning agent 173.

Referring next to step 213, the scanning agent 173 scans or otherwise analyzes each of the client applications 166 included in the list of installed applications 183 to determine whether any of the client applications 166 violate one or more of the policies 143 provided by the management service 119. For example, the scanning agent 173 can compare each client application 166 included in the list of installed applications 183 with each application signature 153 provided by the scanning agent 173. If a client application 166 in the list of installed applications 183 matches an application signature 153, the scanning agent 173 can then determine if the match causes the client device 113 to violate one or more of the policies 143. For example, if a client application 166 in the list of installed application 179 matches an application signature 153 for a specific version of an application, the scanning agent 173 can then query the policies 143 to determine if there is a policy 143 that prohibits that version of the application from being installed.

Proceeding to step 216, the scanning agent 173 sends any policy violations that are identified as a result of the analysis performed in step 213 to the scanning service 146. In some instances, the scanning agent 173 can also provide an identifier of the individual client applications 166 that triggered the policy violation. In other instances, the scanning agent 173 can provide an identification of the policies 143 violated.

Moving on to step 219, the scanning service 146 notifies the management service 119 of any policy violations reported by the scanning agent 173. This notification can include the device identifier 139 of the client device 113 affected. This notification can also include an identification of one or more policies 143 that were violated or an identifier of the individual client applications 166 that triggered the violation. In some embodiments, this step could also be performed separately or concurrently by the scanning agent 173.

Referring next to step 223, the management service 119 notifies the management agent 169 of the policy 143 that was violated. At this step, the management service 119 can, in some instances, change a compliance status of the client device 113. For example, the management service 119 can track which client devices 113 currently comply with all applicable policies 143 as a basis for granting or denying requests from client devices 113 to particular resources (e.g. installing an application or accessing a service or server). Accordingly, the management service 119 can update the compliance status of the client device 113 to reflect its current, non-compliant state when the management service 119 notifies the management agent 169 of the policy violations. In some instances, the management service 119 can also cause a list of the non-compliant client devices 113 to be displayed by the management console 123. Reasons why the client devices 113 were non-compliant could also be displayed (e.g., identifying the policy 143 that was violated or the client applications 166 installed on the client device 113 that caused the policy 143 to be violated).

Proceeding to step 226, the management agent 169 performs the remedial action specified in the policy 143. For example, if the policy 143 specifies that client application 166 should be updated, the management agent 169 could cause the application installer 176 to communicate with the appropriate application service (e.g., the enterprise application service 126 or the public application service 156) to download and install an appropriate version of the client application 166. As another example, if the policy 143 specifies that the client application 166 should be removed, the management agent 169 could cause the application installer 176 to uninstall the client application 166 from the client device 113. Other remedial actions potentially specified in the policy 143, such as those previously discussed, could also be performed at this step to return the client device 113 to a compliant state.

Moving on to step 229, the management agent 169 notifies the management service 119 that the remedial action specified in the policy has been performed. This can serve as a notice to the management service 119 that the client device 113 has returned to a compliant state with respect to the policies 143 applicable to the client device 113. Referring next to step 233, the management service 119 updates the compliance status of the client device 113 in response to receiving the notice from the management agent 169 that the remedial action has been performed.

As a result of the interactions of the management service 119, the scanning service 146, the management agent 169, and the scanning agent 173 described in FIG. 2, the security of client devices 113 is improved. Unauthorized applications, such as malware or applications with known security or compatibility issues, installed on a client device 113 are identified. Remedial actions, such as uninstalling or upgrading the application, are performed. The management service 119 is then notified of that the client device 113 has returned to a compliant state in order for the management service 119 to properly track affected or non-compliant client devices 113.

Figure 3:
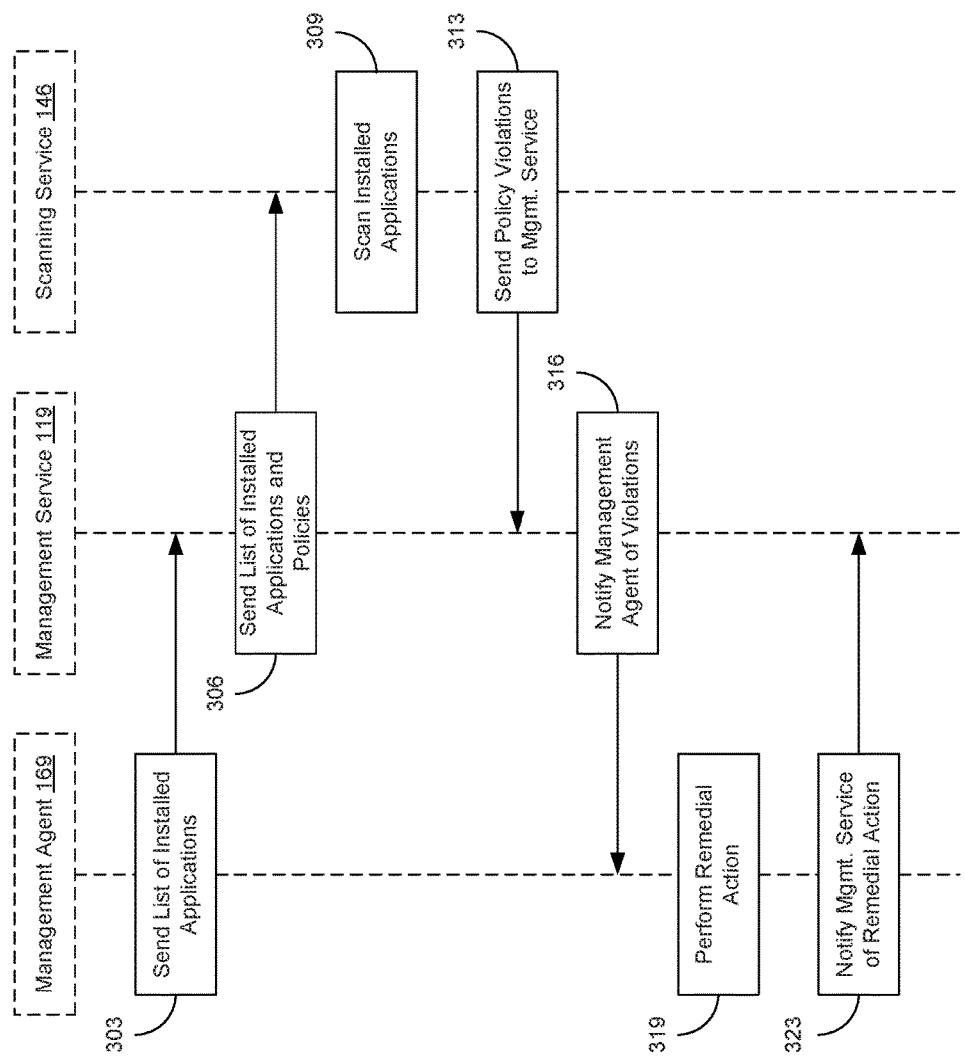
FIG. 3 is a sequence diagram depicting the interaction of various components.

Referring next to FIG. 3, shown is a sequence diagram that provides one example of the interaction anonymized integration of a scanning service 146 into a enterprise computing management system provided by a management service 119. In contrast to other examples, such as the example illustrated in FIG. 2, FIG. 3 illustrates the aggregation of device details of multiple client devices 113 together prior to the use of a scanning service 146. This obscures the details of any singular client device 113. Accordingly, FIG. 3 depicts the interactions between portions of the management service 119, the management agent 169, and the scanning agent 173.

Beginning with step 303, the management agent 169 sends the list of installed applications 183 to the management service 119. This can provide the management service 119 with a listing of all client applications 166 currently installed on the client device 113. In some instances, the management agent 169 can also supply the management service 119 with the device identifier 139 of the client device 113 in order for the management service 119 to track individual client applications 166 installed on the client device 113.

Proceeding to step 306, the management service 119 sends the list of installed applications 183 and at least one policy 143 to the scanning service 146. In contrast to other examples previously discussed, the management service 119 does not report the device identifier 139 to the scanning service 146 in order to protect the privacy or anonymity of the client device 113 with respect to the scanning service 146. In some instances, the management service 119 can wait until several client devices 113 have provided a list of installed applications 183 and then send the lists of installed applications 183 as a batch to the scanning service 146. In those instances where the management service 119 sends several lists of installed applications 183 as a batch to the scanning service 146, the client device 113 can be further anonymized from the scanning service 146.

Moving on to step 309, the scanning service 146 scans the list of installed applications 183 to determine whether any client applications 166 identified in the list of installed applications 183 violate a policy 143 provided by the management service 119. For example, the scanning service 146 can determine whether an application in the list of installed applications 183 is specified in a policy 143. As another example, the scanning service 146 can compare an application identified in the list of installed applications 183 with applications signatures 153. If a client application 166 identified in the list of installed applications 183 matches an application signature 153, the scanning service 146 can then compare details of the client application with the supplied policy 143. For example, a policy 143 can specify that client applications 166 that are identified by the scanning service 146 as malware applications should not be installed on the client device 113. If the client application 166 in the list of installed applications 183 matches an application signature 153 of a malware application, then the scanning service 146 could determine that the presence of the client application 166 on the client device 113 violates the policy 143. The scanning service 146 could then send a message to the management service 119 that the client application 166 installed on the client device 113 is a malware application.

Referring next to step 313, the scanning service 146 sends a list of policy violations to the management service 119. Each policy violation reported can include the policy 143 violated and an identification of the client application 166 that violated the policy. However, in some instances in some instances, the policy 143 itself can specify this information, in which case supplying the policy 143 to the management service 119 can also serve to notify the management service 119 of the identity of the client application 166 that violates the policy.

Proceeding to step 316, the management service 119 notifies the management agent 169 of the policy 143 violated. The notification can include an identifier of the client application 166 that violated the policy. For example, if a policy 143 specifies that a particular client application 166 or a particular version of a client application 166 should not be installed, then the management service 119 can identify the client application 166 or version of the client application 166 that violated the policy. However, in some instances, the policy 143 itself can specify this information, in which case supplying the policy 143 to the management agent 169 can also serve to notify the management agent 169 of the client application 166 that violated the policy 143.

In some instances, the management service 119 can also change a compliance status of the client device 113. For example, the management service 119 can track which client devices 113 currently comply with all applicable policies 143 as a basis for granting or denying requests from client devices 113 to particular resources (e.g. installing an application or accessing a service or server). Accordingly, the management service 119 can update the compliance status of the client device 113 to reflect its current, non-compliant state when the management service 119 notifies the management agent 169 of the policy violations.

Moving on to step 319, the management agent 169 performs a remedial action specified in the policy 143. For example, if the policy 143 specified that the client application 166 should be removed, then the management agent 169 could cause the application installer 176 to remove the client application 166 from the client device 113. Likewise, if the policy 143 specifies that specific data (e.g., confidential enterprise or corporate data, usernames and passwords for enterprise provided services, or other data) should be removed from the client device 113, the management agent 169 could delete the specified data from the memory of the client device 113. Other remedial actions specified in the policy 143, such as those remedial actions previously discussed, could also be performed at this step.

Referring next to step 323, the management agent 169 notifies the management service 119 that the remedial action specified in the policy 143 has been performed. This notification can include a request to update the compliance status of the client device 113 to reflect that the client device 113 has returned to a compliant state. However, some configurations can omit this request. In these configurations, the management service 119 will automatically update the compliance status of the client device 113 in response to receiving a notification that the remedial action was performed.

As a result of the interactions of the management service 119, the management agent 169, and the scanning agent 173 described in FIG. 3, the security of client devices 113 is improved. Unauthorized applications, such as malware or applications with known security or compatibility issues, installed on a client device 113 are identified. Remedial actions, such as uninstalling or upgrading the application, are performed. The management service 119 is then notified of that the client device 113 has returned to a compliant state in order for the management service 119 to properly track affected or non-compliant client devices 113.

Figure 4:
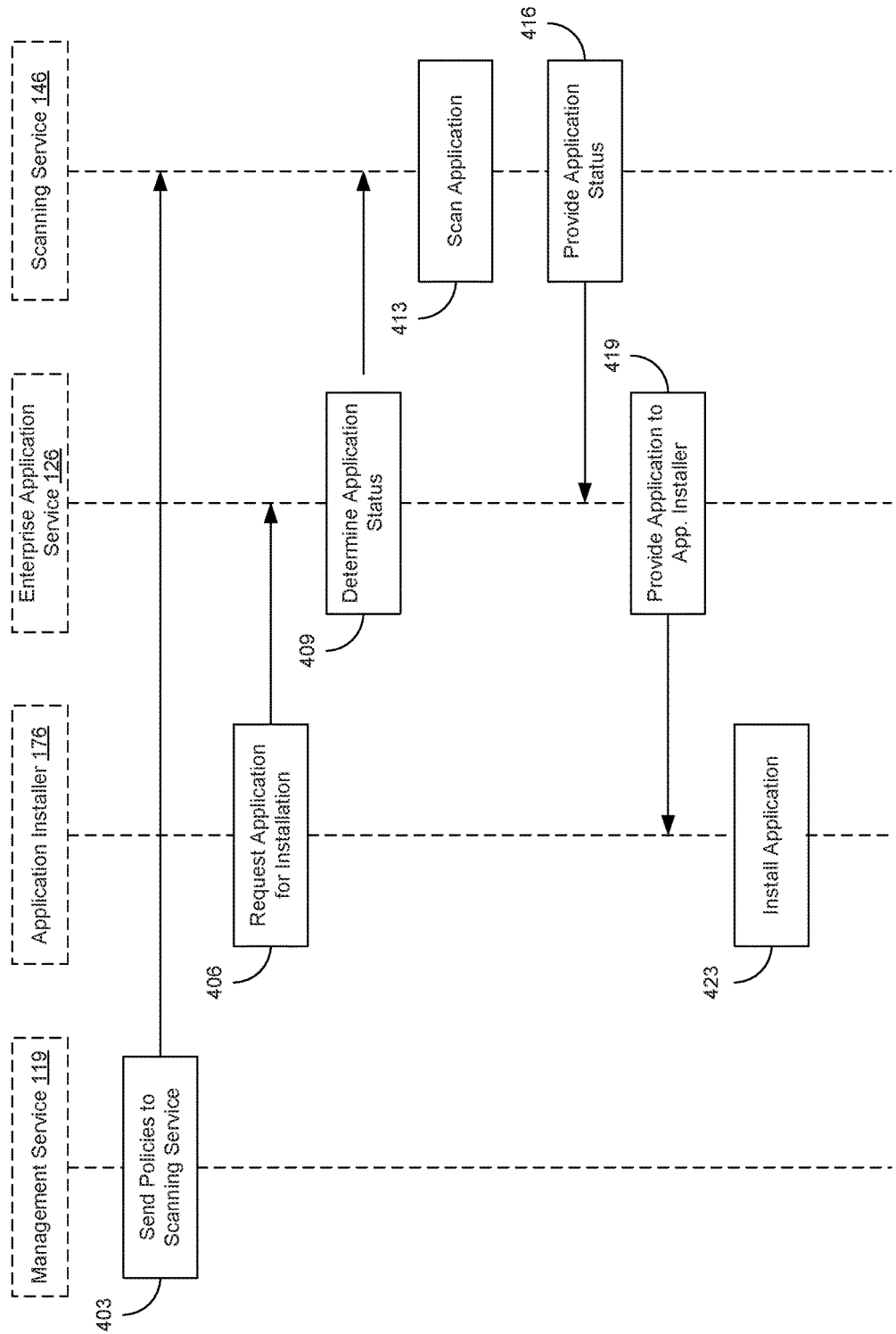
FIG. 4 is a sequence diagram depicting the interaction of various components.

FIG. 4 depicts a sequence diagram that illustrating the use of a scanning service 146 to approve or deny requests to install applications on a client device 113. To illustrate the principals involved in integrating the scanning service 146, FIG. 4 provides one example of the interaction between portions of the management service 119, the enterprise application service 126, the scanning service 146, and the application installer 176. Although the sequence diagram of FIG. 4 depicts the interactions required to install an application through the enterprise application service 126 according to various embodiments of the present disclosure, alternative paths of execution are discussed as well.

Beginning at step 403, the management service 119 provides a list of policies 143 to the scanning service 146. As previously discussed, these policies 143 can specify which client applications 166 are explicitly approved or unapproved for installation on the client device 113. For example, a policy 143 could specify that a particular application or version of an application is approved for installation. As another example, a policy 143 could specify that another application or version of the application is unapproved. As another example, a policy 143 could specify that applications with certain characteristics are unapproved for installation. For example, a policy 143 could specify that an application classified as malware by the scanning service 146 is unapproved for installation. Similarly, a policy 143 could specify that an application containing or linked to libraries or similar components associated with malware are unapproved for installation. In a further example, a policy 143 could specify that an application is not approved for installation if it requires certain permissions (e.g., read from or write to the filesystem, access the network 116, or some other permission). A policy 143 could also specify default actions. For example, a policy 143 could specify that an application is approved for installation unless it violates another policy 143. For instance, a policy 143 could specify that a web browser can be installed unless installation would violate another policy 143 prohibiting installation of applications that were not signed with a specific developer key. As another example, a policy 143 could specify that an application is unapproved for installation unless it is explicitly approved for installation by another policy 143. As a third default option, a policy 143 could specify that an application not explicitly approved for installation by another policy 143 must be manually reviewed and approved or denied.

Independently at step 406, the application installer 406 sends a request to the enterprise application service 126 to install an application. The request can be initiated, for example, in response to a user interaction with the application installer 176. The request can include, for example, an identifier of an application to be installed.

Proceeding next to step 409, the enterprise application service 409 determines the application status. The enterprise application service 409 could, for example, determine whether the requested application has been previously approved for installation or request that the scanning service 146 approve the requested application for installation. In one example, if the requested application corresponds to a previously approved enterprise application 133, then the enterprise application service 126 could proceed directly to step 419. As another example, if the requested application has been previously approved for installation as a result of a previous installation request, then the enterprise application service 126 could proceed directly to step 419. However, if the requested application has not been previously approved for installation (e.g., a public application 159 being installed through the enterprise application service 126), then the enterprise application service 126 can send a request to the scanning service 146 to scan the requested application in order to approve or deny the request to install the application.

Moving on to step 413, the scanning service 146 scans the requested application for compliance with the policies previously provided by the management service 119 at step 403. In some instances, the scanning service 146 can retrieve a copy of the requested application from the enterprise application service 126. In other instances a copy of the requested application is already stored in the scanning data store 149. As part of the scanning process, the scanning service 146 can compare the requested application with various application signatures 153 to determine or verify the identity of requested application as well as identify the components of the requested application. As a result, the scanning service 146 can determine whether the requested application is a genuine instance or version of the application requested, whether the requested application has been previously classified as malware, whether individual components of the requested application are associated with malware or are associated with the functions performed or functionality provided by the application, as well as other characteristics of the requested application.

The scanning service 146 can then compare these identified characteristics with the policies 143 previously provided by the management service 119 to determine whether the application complies with all of the applicable policies 143 or violates any of the applicable policies 143. For example, if the scanning service 146 determines that an application signature 153 of a known instance of malware matches the requested application, the scanning service 146 could determine that installation would violate a policy 143 that prohibits installation of malware. As another example, if the scanning service 146 determines that an application signature 153 for a specific version of the requested application known to contain security vulnerabilities matches the requested application, the scanning service 146 could determine that installation would violate a policy 143 that prohibits installation of application versions with known security vulnerabilities. In some instances, the scanning service 146 could determine that only a default policy 143 specifying a default action applies. For example, the scanning service 146 could determine that the requested application does not violate any policy 143, so a default action to allow the requested application to be installed could be followed. As another example, the scanning service 146 could determine that a default action to request explicit approval to install the application applies.

In instances where explicit approval to install the requested application is required, the scanning service 146 can initiate a request to have the application approved for installation. For example, the scanning service 146 can send an email, short message service (SMS) message, or similar electronic message, to an administrator of the enterprise computing environment 103. The message could include the name and a description of the requested application, the name of the user requesting to install the application, the version of the operating system currently installed on the client device 113 and potentially other information. In some instances, the message can direct the administrator to the management console 123 to approve or deny the request to install the application. Once the administrator approves or denies the request to install the application, the scanning service can mark the requested application as approved for installation or mark as prohibited from installation.

After the application status is determined, it is provided to the application installer 176. For example, at step 416, the scanning service 146 provides the application status previously determined at step 413 to the enterprise application service 126.

As a result of the interactions of the management service 119, the enterprise application service 126, the scanning service 146, and the application installer 176 described in FIG. 4, installation of insecure applications, malware applications, buggy applications, as well as other applications, can be prevented. Further, in instances where a policy does not apply to an application being installed on a client device 113, default approval or denial of the installation can be configured, allowing administrators to balance convenience for users with security concerns related to installation of applications on the client device 113.

Proceeding next to step 419, the enterprise application service 126 provides a copy of the requested application to the application installer 176 for installation on the client device 113 in response to a determination that the application is approved for installation. In one example, the enterprise application service 126 can send a copy of the requested application for installation. In another example, the enterprise application service 126 can provide a uniform resource locator (URL) to the application installer 176 that specifies a location from which the application installer 176 can download the requested application. Moving on to step 423, the application installer 176 then installs the requested application on the client device 113.

The sequence diagrams of FIGS. 2, 3 and 4 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the enterprise computing environment 103, the scanning computing environment 106, and the public computing environment 109, as well as the client device 113, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 119, management console 123, enterprise application service 126, scanning service 146, public application service 156, client application 166, management agent 169, scanning agent 173, application installer 176, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
a server comprising a server processor and a server memory;
a client device in data communication with the server, the client device comprising a client processor and a client memory; and
a management service stored in the server memory that, when executed by the server processor, causes the server to at least:
receive a list of installed applications from the client device;
add the list of installed applications to an aggregate listing of applications, wherein the aggregate listing of applications represents a list of client applications installed on one or more of a plurality of client devices;
hide at least one device identifier associated with the plurality of client devices in the aggregate listing of applications;
send to a scanning service a policy comprising an identifier of a prohibited client application;
determine a quantity of the client devices that have transmitted a respective list for the aggregate listing of applications;
send the aggregate listing of applications to the scanning service in response to the quantity of the client devices exceeding a quantity threshold;
receive a notification from the scanning service, the notification comprising an indication that the prohibited client application is present in the aggregate listing of applications;
send a message to the client device instructing the client device to determine whether the prohibited client application is installed on the client device and to perform a remedial action specified by the policy in response to a determination that the prohibited client application is installed on the client device; and
receive a notification message that comprises a request to update a compliance status of the client device to indicate that the client device is in a compliant state.

2. The system of claim 1, wherein the remedial action comprises causing the client device to uninstall the prohibited client application.

3. The system of claim 1, wherein the remedial action comprises causing the client device to upgrade the prohibited client application.

4. The system of claim 1, wherein the remedial action comprises causing the client device to modify a permission assigned to the prohibited client application.

5. The system of claim 1, wherein the remedial action comprises causing the client device to modify a setting of the prohibited client application.

6. The system of claim 1, wherein the prohibited client application comprises a first client application stored in the client memory and the remedial action comprises causing the client device to uninstall a second client application stored in the client memory.

7. The system of claim 1, wherein the remedial action comprises resetting the client device to an initial state.

8. A method, comprising:
receiving a list of installed applications from a client device;
adding the list of installed applications to an aggregate listing of applications, wherein the aggregate listing of applications represents a list of client applications installed on one or more of a plurality of client devices;

hiding at least one device identifier associated with the plurality of client devices in the aggregate listing of applications;

sending to a scanning service a policy comprising an identifier of a prohibited client application;

determining a quantity of the client devices that have transmitted a respective list for the aggregate listing of applications;

sending the aggregate listing of applications to the scanning service in response to the quantity of the plurality of client devices exceeding a quantity threshold;

receiving a notification from the scanning service, the notification comprising an indication that the prohibited client application is present in the aggregate listing of applications;

sending a message to the client device instructing the client device to determine whether the prohibited client application is installed on the client device and to perform a remedial action specified by the policy in response to a determination that the prohibited client application is installed on the client device; and receiving a notification message that comprises a request to update a compliance status of the client device to indicate that the client device is in a compliant state.

9. The method of claim 8, wherein the remedial action comprises causing the client device to uninstall the prohibited client application.

10. The method of claim 8, wherein the remedial action comprises causing the client device to upgrade the prohibited client application.

11. The method of claim 8, wherein the remedial action comprises causing the client device to modify a permission assigned to the prohibited client application.

12. The method of claim 8, wherein the remedial action comprises causing the client device to modify a setting of the prohibited client application.

13. The method of claim 8, wherein the prohibited client application comprises a first client application and the remedial action comprises causing the client device to uninstall a second client application from the client device.

14. A non-transitory computer readable medium comprising machine readable instructions that, when executed by a processor of a computing device, cause the computing device to at least:

receive a list of installed applications from a client device;

add the list of installed applications to an aggregate listing of applications, wherein the aggregate listing of applications represents a list of client applications installed on one or more of a plurality of client devices;

hide at least one device identifier associated with the plurality of client devices in the aggregate listing of applications;

send to a scanning service a policy comprising an identifier of a prohibited client application, wherein installation of the prohibited client application is prohibited on the client device;

determine a quantity of the client devices that have transmitted a respective list for the aggregate listing of applications;

send the aggregate listing of applications to the scanning service in response to the quantity of the plurality of client devices exceeding a quantity threshold;

receive a notification from the scanning service, the notification comprising an indication that the prohibited client application is present in the aggregate listing of applications;

send a message to the client device instructing the client device to determine whether the prohibited client application is installed on the client device and to perform a remedial action specified by the policy in response to a determination that the prohibited client application is installed on the client device; and receive a notification message that comprises a request to update a compliance status of the client device to indicate that the client device is in a compliant state.

15. The non-transitory computer readable medium of claim 14, wherein the remedial action comprises causing the computing device to upgrade the prohibited client application.

16. The non-transitory computer readable medium of claim 14, wherein the remedial action comprises causing the computing device to modify a permission assigned to the prohibited client application.

17. The non-transitory computer readable medium of claim 14, wherein the remedial action comprises causing the computing device to modify a setting of the prohibited client application.

18. The non-transitory computer readable medium of claim 14, wherein the prohibited client application comprises a first client application and the remedial action comprises causing the computing device to uninstall a second client application from the computing device.

19. The non-transitory computer readable medium of claim 14, wherein the notification message from the client device indicates that the remedial action has been performed.

20. The method of claim 14, wherein the notification message from the client device indicates that the remedial action has been performed.

* * * * *